United States Patent
Kasai

(10) Patent No.: US 9,302,545 B2
(45) Date of Patent: Apr. 5, 2016

(54) TIRE FOR MOTORCYCLE

(75) Inventor: Katsumi Kasai, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 940 days.

(21) Appl. No.: 12/678,913

(22) PCT Filed: Aug. 21, 2008

(86) PCT No.: PCT/JP2008/002260
§ 371 (c)(1),
(2), (4) Date: Mar. 18, 2010

(87) PCT Pub. No.: WO2009/037805
PCT Pub. Date: Mar. 26, 2009

(65) Prior Publication Data
US 2010/0212799 A1   Aug. 26, 2010

(30) Foreign Application Priority Data
Sep. 18, 2007   (JP) .................................. 2007-240550

(51) Int. Cl.
*B60C 11/00*   (2006.01)

(52) U.S. Cl.
CPC .............. *B60C 11/00* (2013.01); *B60C 11/005* (2013.01); *B60C 11/0058* (2013.04); *B60C 2011/0025* (2013.04); *B60C 2200/10* (2013.04)

(58) Field of Classification Search
CPC ............. B60C 11/0058; B60C 11/005; B60C 2011/0025
USPC ......................................... 152/209.5, 209.11
See application file for complete search history.

(56) References Cited

U.S. PATENT DOCUMENTS

| 4,385,653 A | * | 5/1983 | Okazaki et al. ............ 152/209.5 |
| 4,588,009 A | * | 5/1986 | Kitazawa et al. .......... 152/209.5 |

(Continued)

FOREIGN PATENT DOCUMENTS

| DE | 3637825 A1 * | 5/1987 |
| EP | 1 632 364 A1 | 3/2006 |

(Continued)

OTHER PUBLICATIONS

Machine trnaslation for Japan 2006-273240 (no date).*

(Continued)

*Primary Examiner* — Steven D Maki
(74) *Attorney, Agent, or Firm* — Birch, Stewart, Kolasch & Birch, LLP

(57) ABSTRACT

[Problem] It is an object to provide a tire for a motorcycle which realizes a low fuel consumption and is also excellent in a grip performance.
[Means for Resolution] A tire (2) includes a tread (4) and a carcass (12) having a radial structure. The tread (4) includes a base layer (21) and a cap layer (22). The cap layer (22) has a center region (23) and a pair of shoulder regions (24) positioned on an outside in an axial direction with respect to the center region (23). A ratio (Wc/Wt) of a width (Wc) of the center region (23) to a width (Wt) of the tread (4) is equal to or higher than 0.15 and is equal to or lower than 0.4. A loss tangent (tan δc) of the center region (23) is smaller than a loss tangent (tan δs) of the shoulder region (24). A loss tangent (tan δb) of the base layer (21) is smaller than the loss tangent (tan δs) of the shoulder region (24). The loss tangent (tan δb) of the base layer (21) is equal to or smaller than 0.15. The loss tangent (tan δb) of the base layer (21) is equal to or smaller than the loss tangent (tan δc) of the center region (23).

4 Claims, 1 Drawing Sheet

(56) References Cited

U.S. PATENT DOCUMENTS

| | | | |
|---|---|---|---|
| 6,516,847 B1* | 2/2003 | Amaddeo et al. | 152/209.5 |
| 2002/0007893 A1* | 1/2002 | Koyama et al. | 156/123 |
| 2004/0112490 A1* | 6/2004 | Sandstrom | 152/209.5 |
| 2006/0207701 A1* | 9/2006 | Tanaka | 152/209.5 |
| 2007/0102083 A1* | 5/2007 | Hayashi | 152/209.5 |
| 2009/0020200 A1* | 1/2009 | Ogawa et al. | 152/209.11 |

FOREIGN PATENT DOCUMENTS

| | | | | |
|---|---|---|---|---|
| JP | 56-079004 A | * | 6/1981 | |
| JP | 60-094804 A | * | 5/1985 | |
| JP | 2001-191730 A | * | 7/2001 | |
| JP | 2003-071945 A | * | 3/2003 | |
| JP | 2005-271760 A | | 10/2005 | |
| JP | 2006-199112 A | | 8/2006 | |
| JP | 2006-256385 A | | 9/2006 | |
| JP | 2006273240 A | * | 10/2006 | |
| JP | 2007-131112 A | | 5/2007 | |
| JP | 2008-189041 A | | 8/2008 | |

OTHER PUBLICATIONS

Machine translation for Japan 2001-191730 (no date).*
Machine translation for Japan 2003-071945 (no date).*
Machine translation for German 3,637,825 (no date).*

* cited by examiner

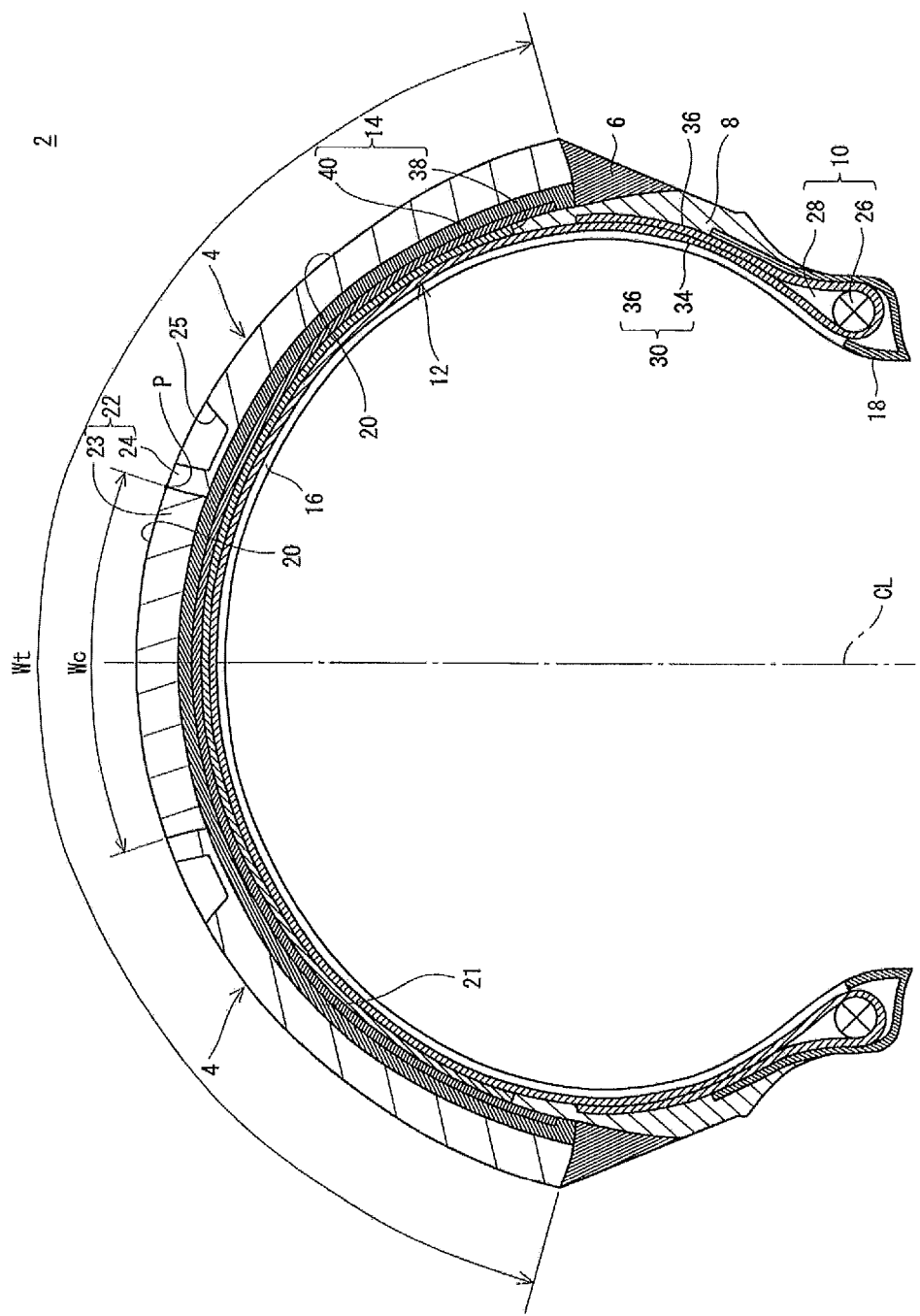

TIRE FOR MOTORCYCLE

TECHNICAL FIELD

The present invention relates to a pneumatic tire to be attached to a motorcycle. In detail, the present invention relates to an improvement in a tread of a tire.

BACKGROUND ART

In cornering of a motorcycle, a centrifugal force acts on the motorcycle. For the cornering, it is necessary to apply a cornering force. The cornering force is balanced with the centrifugal force. In the cornering, a rider tilts the motorcycle inward. By a camber thrust generated through the tilt, the cornering can be achieved. In order to easily carry out the cornering, a tire for the motorcycle includes a tread having a small radius of curvature. In straight running, a center region of the tread comes in contact with a ground. On the other hand, in the cornering, a shoulder region comes in contact with the ground. A tire considering respective roles of the center region and the shoulder region has been described in Japanese Laid-Open Patent Publication No. 2005-271760 and Japanese Laid-Open Patent Publication No. 2007-131112. The tire is excellent in various performances.

[Patent Document 1] Japanese Laid-Open Patent Publication No. 2005-271760
[Patent Document 2] Japanese Laid-Open Patent Publication No. 2007-131112

DISCLOSURE OF THE INVENTION

Problems that the Invention is to Solve

As a part of countermeasures to cope with an environmental problem, tires having a low fuel consumption for a passenger car, a truck and a bus have been developed. A tire having a small loss tangent $\tan \delta$ of a tread in the tire has a small energy loss. The tire having the small loss tangent $\tan \delta$ can realize a low fuel consumption. On the other hand, the tire having the small loss tangent $\tan \delta$ has a poor grip performance. The tire having the poor grip performance is apt to slip. In a motorcycle, a grip performance in straight running, cornering and a transition between the straight running and the cornering is particularly important.

By using a rubber having a small loss tangent $\tan \delta$ for a tread, it is possible to obtain a tire for a low fuel consumption. In the tire having the small loss tangent $\tan \delta$, it is impossible to sufficiently obtain the grip performance in the cornering and the grip performance in the transition between the straight running and the cornering. The sufficient grip performance is also required for a quick stop and a quick start of the straight running. In a tire having a poor grip performance, there is a possibility that a slip might be caused in a braking operation of the straight running. In the tire, a stopping distance is increased. In the tire, the slip is also caused in an accelerating operation of the straight running. The tire has a poor accelerating performance.

It is an object of the present invention to provide a tire for a motorcycle which realizes a low fuel consumption and is also excellent in a grip performance.

Means for Solving the Problems

A tire for a motorcycle according to the present invention includes a tread and a carcass having a radial structure. The tread includes a base layer positioned on an inside in a radial direction and a cap layer positioned on an outside. The cap layer has a center region and a pair of shoulder regions positioned on an outside in an axial direction with respect to the center region. A ratio (Wc/Wt) of a width Wc of the center region to a width Wt of the tread is equal to or higher than 0.15 and is equal to or lower than 0.4. A loss tangent $\tan \delta c$ of the center region is smaller than a loss tangent $\tan \delta s$ of the shoulder region. A loss tangent $\tan \delta b$ of the base layer is smaller than the loss tangent $\tan \delta s$ of the shoulder region. The loss tangent $\tan \delta b$ of the base layer is equal to or smaller than 0.15. The loss tangent $\tan \delta b$ of the base layer is equal to or smaller than the loss tangent $\tan \delta c$ of the center region.

It is preferable that the loss tangent $\tan \delta b$ of the base layer should be smaller than the loss tangent $\tan \delta c$ of the center region in the tire. It is preferable that a ratio ($\tan \delta s / \tan \delta b$) of the loss tangent $\tan \delta s$ of the shoulder region to the loss tangent $\tan \delta b$ of the base layer should be equal to or higher than two. It is preferable that the loss tangent $\tan \delta c$ of the center region should be equal to or greater than 0.05 and should be equal to or smaller than 0.15. It is preferable that the loss tangent $\tan \delta s$ of the shoulder region should be equal to or greater than 0.20 and should be equal to or smaller than 0.35.

Effect of the Invention

In the straight running of the motorcycle, the center region of the tire mainly comes in contact with a ground. The tire according to the present invention has the small loss tangent $\tan \delta c$ in the center region. Therefore, a low fuel consumption can be obtained. Referring to the tire, the center region and a part of the shoulder region come in contact with the ground through a deformation of the tire due to a load movement in braking and accelerating operations in the straight running. A part of the shoulder region comes in contact with the ground so that a high grip performance is exhibited in the tire. In the cornering, the shoulder region mainly comes in contact with the ground. In the cornering, the shoulder region comes in contact with the ground so that a high grip performance is exhibited. In the cornering, the base layer receives an external force in an overlap with the shoulder region which comes in contact with the ground. The tire exhibits a high grip performance in the cornering, and furthermore, has a low fuel consumption. The tire has the small loss tangent $\tan \delta c$ of the center region, and furthermore, is excellent in the grip performance. The tire has the low fuel consumption, and furthermore, is excellent in the grip performance.

BRIEF DESCRIPTION OF THE DRAWING

FIG. 1 is a sectional view showing a tire according to an embodiment of the present invention.

EXPLANATION OF DESIGNATIONS

2 . . . tire
4 . . . tread
6 . . . wing
8 . . . sidewall
10 . . . bead
12 . . . carcass
14 . . . belt
16 . . . inner liner
18 . . . chafer
20 . . . tread surface
21 . . . base layer
22 . . . cap layer
23 . . . center region 24 ... shoulder region
25 ... groove
26 ... core
28 ... apex
30 ... carcass ply
34 ... main portion
36 ... fold-back portion
38 ... inner ply
40 ... outer ply

BEST MODE FOR CARRYING OUT THE
INVENTION

The present invention will be described below in detail based on a preferred embodiment with reference to the drawings.

FIG. 1 is a sectional view showing a tire 2 according to an embodiment of the present invention. In FIG. 1, a vertical direction indicates a radial direction and a transverse direction indicates an axial direction. The tire 2 takes an almost symmetrical shape with respect to a one-dotted chain line CL. The one-dotted chain line represents an equator plane. The tire 2 includes a tread 4, a wing 6, a sidewall 8, a bead 10, a carcass 12, a belt 14, an inner liner 16 and a chafer 18. The tire 2 is a pneumatic tire of a tubeless type. The tire 2 is attached to a motorcycle.

The tread 4 takes an outward convex shape in the radial direction. The tread 4 is formed by a base layer 21 and a cap layer 22. The cap layer 22 includes a tread surface 20 to come in contact with a road surface. The cap layer 22 is laminated on an outside in the radial direction with respect to the base layer 21. The cap layer 22 has a single center region 23 and a pair of shoulder regions 24. The cap layer 22 may have a further region on an outside in the axial direction with respect to the shoulder region 24. The center region 23 is provided across the equator plane CL. The center region 23 is almost symmetrical with respect to the equator plane CL. The pair of shoulder regions 24 is positioned on an outside of the center region 23 in the axial direction. The pair of shoulder regions 24 is almost symmetrical with respect to the equator plane CL with each other. In the tire 2, a groove 25 is formed in the shoulder region 24. The groove 25 may be formed in the center region 23. The groove 25 is formed in the cap layer 22. The groove 25 does not reach the base layer 21. Even if a wear limit of the tire 2 is reached, the base layer 21 is not exposed.

The sidewall 8 is extended almost inward in the radial direction from an end of the tread 4. The sidewall 8 is constituted by a crosslinked rubber composition. The sidewall absorbs a shock from the road surface by a flexure. Furthermore, the sidewall 8 prevents an external damage of the carcass 12.

The bead 10 is positioned on an almost inside in the radial direction from the sidewall 8. The bead 10 includes a core 26 and an apex 28 extended outward in the radial direction from the core 26. The apex 28 is tapered outward in the radial direction. The apex 28 is constituted by a crosslinked rubber composition. The apex 28 has a high hardness.

The carcass 12 is formed by a carcass ply 30. The carcass ply 30 is extended along internal surfaces of the tread 4 and the sidewall 8. The carcass ply 30 is folded back from an inside toward an outside in the axial direction around the core 26. By the fold-back, a main portion 34 and a fold-back portion 36 are formed in the carcass ply 30. The fold-back portion 36 is superposed on an external surface of the main portion 34.

The carcass ply 30 is formed by a cord and a topping rubber, which is not shown. An absolute value of an angle formed by the cord with respect to the equator plane CL is 65° to 90°. In other words, the tire 2 has a radial structure. The cord is constituted by an organic fiber. Examples of a preferable organic fiber include a polyester fiber, a nylon fiber, a rayon fiber, a polyethylene naphthalate fiber and an aramid fiber.

The belt 14 is positioned on an outside in the radial direction with respect to the carcass 12. The belt 14 is superposed on the carcass 12. The belt 14 reinforces the carcass 12. The belt 14 is formed by an inner ply 38 and an outer ply 40. Each of the inner ply 38 and the outer ply 40 is formed by a large number of cords which are provided in parallel and a topping rubber, which is not shown. The cord is tilted with respect to the equator plane. An absolute value of a tilt angle is equal to or greater than 10° and is equal to or smaller than 35°. A tilt direction of the cord of the inner ply 38 is reverse to a tilt direction of the cord of the outer ply 40. A material of the cord is steel or an organic fiber. A preferable material of the cord is the steel. An organic fiber may be used for the cord.

The inner liner 16 is superposed on an inner peripheral surface of the carcass 12. The inner liner 16 is constituted by a crosslinked rubber. A rubber having an excellent air insulating property is used for the inner liner 16. The inner liner 16 plays a part in holding an internal pressure of the tire 2.

A point P in FIG. 1 indicates an intersecting point on which an interface between the center region 23 and the shoulder region 24 intersects the tread surface 20 in a section of FIG. 1. A double arrow Wt in FIG. 1 indicates a width of the tread 4. The width Wt represents a distance from one of tread ends to the other tread end. The width Wt is measured along the tread surface 20. A double arrow Wc indicates a width of the center region 23. The width Wc represents a distance from the point P on one of the ends of the center region 23 to the other end of the center region 23. The width Wc is measured along the tread surface 20. The widths Wt and Wc are measured in a sample obtained by cutting the tire 2.

In the tire 2 for a motorcycle, a contact surface of the tread surface 20 is varied depending on a running state. In the tire 2, the center region 23 and the shoulder region 24 are disposed in such a manner that the center region 23 comes in contact with a ground in a state in which straight running is carried out at an almost constant speed. The center region 23 is formed by crosslinking a rubber composition. The center region 23 has a small loss tangent tan $\delta c$. By the center region 23, a fuel consumption in the straight running of the tire 2 is excellent. In respect of the fact that the center region 23 mainly comes in contact with the ground in the straight running, a ratio (Wc/Wt) of the width Wc of the center region 23 to the width Wt of the tread 4 is equal to or higher than 0.15. The ratio (Wc/Wt) is further preferably equal to or higher than 0.2 and is particularly preferably equal to or higher than 0.25.

The shoulder region 24 is formed by crosslinking a rubber composition. A loss tangent tan $\delta s$ of the shoulder region 24 is greater than the loss tangent tan $\delta c$ of the center region 23. The shoulder region 24 is more excellent in a grip performance as compared with the center region 23.

As compared with the state in which the straight running is carried out at an almost constant speed, the contact surface of the tread 4 is enlarged by a deformation of the tire through a load movement in braking and accelerating operations. In the tire 2, the center region 23 and the shoulder region 24 are disposed in such a manner that the center region 23 and a part of the shoulder region 24 come in contact with the ground in the braking and accelerating operations. In the braking operation, a load applied to a front tire is increased so that a contact surface of the front tire is enlarged. In the accelerating operation, a load of a rear tire of a driving wheel is increased so that a contact surface of the rear tire is enlarged. In the braking and accelerating operations, the center region 23 and the shoulder region 24 come in contact with the ground.

Consequently, the tire 2 is excellent in the grip performance in the braking and accelerating operations. In respect of the fact that the shoulder region 24 sufficiently comes in contact with the ground in the braking and accelerating operations, the ratio (Wc/Wt) of the width Wc of the center region 23 to the width Wt of the tread 4 is equal to or lower than 0.4. The ratio (Wc/Wt) is further preferably equal to or lower than 0.35 and is particularly preferably equal to or lower than 0.3.

The base layer 21 is positioned on an inside in the radial direction with respect to the center region 23 and the pair of shoulder regions 24. The base layer 21 is formed by crosslinking a rubber composition. The base layer 21 has a small loss tangent tan $\delta b$. The base layer 21 may be formed by the same rubber as the center region 22.

In a transition between the straight running and the cornering, the contact surface of the tread 4 makes a transition between the center region 23 and the shoulder region 24. In the tire 2 having a great difference between the loss tangent tan $\delta c$ of the center region 23 and the loss tangent tan $\delta s$ of the shoulder region 24, a rider is apt to feel uncomfortable in the transition between the straight running and the cornering. In the tire 2, the base layer 21 is positioned on an inside in the radial direction with respect to both the center region 23 and the shoulder region 24. By the structure, the noncomfortableness of the rider is relieved.

As described above, the center region 23 has the small loss tangent tan $\delta c$. By the center region 23, an excellent fuel consumption can be achieved. From this viewpoint, it is preferable that the loss tangent tan $\delta c$ of the center region 23 should be equal to or smaller than 0.15. It is further preferable that the loss tangent tan $\delta c$ should be equal to or smaller than 0.13. In the tire 2, the center region 23 comes in contact with the ground in a state in which the straight running at an almost constant speed is carried out. A necessary grip performance for the straight running is demanded for the center region 23. From this viewpoint, it is preferable that the loss tangent tan $\delta c$ of the center region 23 should be equal to or greater than 0.05. It is further preferable that the loss tangent tan $\delta c$ should be equal to or greater than 0.07.

The center region 23 is laminated on the base layer 21. The loss tangent tan $\delta b$ of the base layer 21 is equal to or smaller than the loss tangent tan $\delta c$ of the center region 23. It is preferable that the loss tangent tan $\delta b$ of the base layer 21 should be smaller than the loss tangent tan $\delta c$ of the center region 23. By the structure, it is possible to further enhance the fuel consumption of the tire 2 when the center region 23 comes in contact with the ground. The center region 23 comes in contact with the ground so that the fuel consumption is further enhanced in the tire 2, and furthermore, the grip performance in the straight running at the almost constant speed is satisfied. From this viewpoint, the loss tangent tan $\delta b$ of the base layer 21 is set to be equal to or smaller than 0.15. The loss tangent tan $\delta b$ is further preferably equal to or smaller than 0.12 and is particularly preferably equal to or smaller than 0.10.

In the cornering, the shoulder region 24 mainly comes in contact with the ground. In the cornering, there is demanded a higher grip performance as compared with that in the straight running. As described above, the tire 2 causes a part of the shoulder region 24 to come in contact with the ground also in the braking and accelerating operations of the straight running. Consequently, a sufficient grip performance is exhibited also in the braking and accelerating operations.

From this viewpoint, the loss tangent tan $\delta s$ of the shoulder region 24 is set to be equal to or greater than 0.20. The loss tangent tan $\delta s$ is further preferably equal to or greater than 0.21 and is particularly preferably equal to or greater than 0.22. The loss tangent tan $\delta s$ is set to be equal to or smaller than 0.35.

The shoulder region 24 is superposed on the base layer 21. The loss tangent tan $\delta b$ of the base layer 21 is smaller than the loss tangent tan $\delta s$ of the shoulder region 24. By the structure, the tire 2 is excellent in the grip performance in the cornering, and furthermore, the fuel consumption is also enhanced. From this viewpoint, it is preferable that a ratio (tan $\delta s$/tan $\delta b$) of the loss tangent tan $\delta s$ of the shoulder region 24 to the loss tangent tan $\delta b$ of the base layer 21 should be equal to or higher than two. It is further preferable that the ratio (tan $\delta s$/tan $\delta b$) should be equal to or higher than 2.2.

The loss tangent tan $\delta$ is measured by a viscoelastic spectrometer ("VA-200" manufactured by SHIMADZU CORPORATION) on the following conditions in accordance with the rules of "JIS-K 6394".

Initial distortion: 10%
Amplitude: ±2%
Frequency: 10 Hz
Deforming mode: tension
Measuring temperature: 70° C.

In the present invention, the dimension and the angle in each member of the tire 2 are measured in a state in which the tire 2 is incorporated in a normal rim and is filled with air to obtain a normal internal pressure if there is no particular description. During the measurement, a load is not applied to the tire 2. In this specification, the normal rim implies a rim determined in rules on which the tire 2 depends. A "standard rim" in the JATMA rules, a "Design Rim" in the TRA rules and a "Measuring Rim" in the ETRTO rules are included in the normal rim. In this specification, the normal internal pressure implies an internal pressure determined in the rules on which the tire 2 depends. A "maximum air pressure" in the JATMA rules, a "maximum value" described in "TIRE LOAD LIMITS AT VARIOUS COLD INFLATION PRESSURES" in the TRA rules and an "INFLATION PRESSURE" in the ETRTO rules are included in the normal internal pressure.

EXAMPLES

Although the effect of the present invention will be apparent from examples, the present invention should not be construed to be restrictive based on the description of the examples.

Experiment 1

Example 1

There was obtained a front tire according to an example 1 which has the structure shown in FIG. 1. A tread of the front tire is formed by a base layer and a cap layer. The cap layer is formed by a center region and a pair of shoulder regions. The base layer has a loss tangent tan $\delta b$ of 0.09. The center region has a loss tangent tan $\delta c$ of 0.09. The base layer and the center region are constituted by the same crosslinked rubber composition. The shoulder region has a loss tangent tan $\delta s$ of 0.30. In the front tire, a ratio (Wc/Wt) is 0.25. The front tire has a size of "120/70ZR17". The tire is of a tubeless type.

Examples 2 to 5 and Comparative Example 2

A ratio (Wc/Wt) of a width Wc of the center region to a width Wt of the tread was set as shown in Table 1. The others were set to be the same as in the example 1 so that tires according to examples 2 to 5 and a comparative example 2 were obtained.

Examples 6 to 9 and Comparative Example 3

The loss tangent tan δc of the center region and the loss tangent tan δb of the base layer were set as shown in Table 2. The others were set to be the same as in the example 1 so that tires according to examples 6 to 9 and a comparative example 3 were obtained.

Examples 10 to 14

The loss tangent tan δs of the shoulder region and the loss tangent tan δb of the base layer were set as shown in the Table 2. The others were set to be the same as in the example 1 so that tires according to examples 10 to 14 were obtained.

Comparative Example 1

In a comparative example 1 shown in the Table 1, a radial tire put on the market is used. A tread is constituted by a single rubber. A loss tangent tan δ of the tread was 0.30. A structure of the tire other than the tread was the same as in the example 1.

[Evaluation of Running Stability]

The tires according to the examples 1 to 14 and the comparative examples 1 to 3 were sequentially attached to a front wheel of a motorcycle which has a displacement of 1300 cc and is put on the market. A rim width was set to be 3.5 inches and an internal pressure of air in the tire was set to be 250 kPa. A conventional tire put on the market was exactly used for a tire of a rear wheel. The motorcycle was caused to run over a circuit course and a rider was caused to execute a sensuous evaluation in relation to a grip performance. The grip performance was evaluated for cornering and braking over a dry road and a wet road. The result is shown in the following Tables 1 and 2. A numeric value was evaluated based on the tire according to the comparative example 1. A greater numeric value represents a higher evaluation. In the evaluation, a numeric value of 90 points or more satisfies a standard.

[Evaluation of Fuel Consumption]

Referring to the tires according to the examples 1 to 14 and the comparative examples 1 to 3, a fuel consumption evaluation test was executed. A gasoline flowmeter was attached to the motorcycle used for the evaluation of a running stability. The fuel consumption evaluation test was executed by causing the motorcycle to run over a circuit course. A running condition includes a distance of 1000 km and a speed of 100 km/h. A fuel consumption was calculated from an amount of consumed gasoline in the test. The result is shown in the following Tables 1 and 2. A numeric value was evaluated based on the tire according to the comparative example 1. The fuel consumption enhanced as compared with the comparative example 1 is shown in % with the fuel consumption according to the comparative example 1 set to be 100%. In the evaluation, a greater numeric value represents a more enhancement in the fuel consumption.

TABLE 1

Result of Evaluation

| | Compara. example 1 | Example 2 | Example 3 | Example 1 | Example 4 | Example 5 | Example 2 |
|---|---|---|---|---|---|---|---|
| Ratio (Wc/Wt) | — | 0.15 | 0.20 | 0.25 | 0.30 | 0.40 | 0.50 |
| Center region tan δc | 0.30 | 0.09 | 0.09 | 0.09 | 0.09 | 0.09 | 0.09 |
| Shoulder region tan δs | | 0.30 | 0.30 | 0.30 | 0.30 | 0.30 | 0.30 |
| Base layer tan δb | | 0.09 | 0.09 | 0.09 | 0.09 | 0.09 | 0.09 |
| Fuel consumption enhancement ratio (%) | — | 0.5 | 1.5 | 2.0 | 2.0 | 2.0 | 2.0 |
| Cornering grip performance Dry road | 100 | 100 | 100 | 100 | 100 | 95 | 85 |
| Cornering grip performance Wet road | 100 | 100 | 100 | 100 | 100 | 90 | 75 |
| Braking grip performance | 100 | 95 | 95 | 90 | 90 | 90 | 80 |

TABLE 2

Result of Evaluation

| | Example 6 | Example 7 | Example 8 | Example 9 | Compara. example 3 | Example 10 | Example 11 | Example 12 | Example 13 | Example 14 |
|---|---|---|---|---|---|---|---|---|---|---|
| Ratio (Wc/Wt) | 0.25 | 0.25 | 0.25 | 0.25 | 0.25 | 0.25 | 0.25 | 0.25 | 0.25 | 0.25 |
| Center region tan δc | 0.05 | 0.09 | 0.15 | 0.20 | 0.20 | 0.09 | 0.09 | 0.09 | 0.09 | 0.09 |
| Shoulder region tan δs | 0.30 | 0.30 | 0.30 | 0.30 | 0.30 | 0.15 | 0.20 | 0.25 | 0.35 | 0.40 |
| Base layer tan δb | 0.05 | 0.07 | 0.07 | 0.07 | 0.20 | 0.07 | 0.07 | 0.07 | 0.07 | 0.07 |
| Fuel consumption enhancement ratio (%) | 3.5 | 2.5 | 1.0 | 0.5 | 0.1 | 2.6 | 2.6 | 2.6 | 2.5 | 2.0 |
| Cornering grip performance Dry road | 95 | 100 | 100 | 100 | 100 | 95 | 97 | 99 | 105 | 110 |
| Cornering grip performance Wet road | 100 | 100 | 100 | 100 | 100 | 90 | 93 | 95 | 110 | 120 |
| Braking grip performance | 80 | 90 | 95 | 98 | 98 | 90 | 90 | 90 | 93 | 95 |

Experiment 2

Example 15

There was obtained a rear tire according to an example 15 which has the structure shown in FIG. 1. A tread of the rear tire is formed by a base layer and a cap layer. The cap layer is formed by a center region and a pair of shoulder regions. The base layer has a loss tangent tan δb of 0.09. The center region has a loss tangent tan δc of 0.09. The base layer and the center region are constituted by the same crosslinked rubber composition. The shoulder region has a loss tangent tan δs of 0.27. In the rear tire, a ratio (Wc/Wt) is 0.25. The rear tire has a size of "180/55ZR17". The tire is of a tubeless type.

Examples 16 to 19 and Comparative Example 5

A ratio (Wc/Wt) of a width Wc of the center region to a width Wt of the tread was set as shown in Table 3. The others were set to be the same as in the example 15 so that tires according to examples 16 to 19 and a comparative example 5 were obtained.

Examples 20 to 23 and Comparative Example 6

The loss tangent tan δc of the center region and the loss tangent tan δb of the base layer were set as shown in Table 4. The others were set to be the same as in the example 15 so that tires according to examples 20 to 23 and a comparative example 6 were obtained.

Examples 24 to 28

The loss tangent tan δs of the shoulder region and the loss tangent tan δb of the base layer were set as shown in the Table 4. The others were set to be the same as in the example 15 so that tires according to examples 24 to 28 were obtained.

Comparative Example 4

In a comparative example 4 shown in the Table 3, a radial tire put on the market is used. A tread is constituted by a single rubber. A loss tangent tan δ of the tread was 0.27. A structure of the tire other than the tread was the same as in the example 15.

[Evaluation of Running Stability]

The tires according to the examples 15 to 28 and the comparative examples 4 to 6 were sequentially attached to a rear wheel of a motorcycle which has a displacement of 1300 cc and is put on the market. A rim width was set to be 5.5 inches and an internal pressure of air in the tire was set to be 290 kPa. The tire according to the example 1 was used for a tire of a front wheel. The motorcycle was caused to run over a circuit course and a rider was caused to execute a sensuous evaluation in relation to a grip performance. The grip performance was evaluated for cornering and acceleration over a dry road and a wet road. The result is shown in the following Tables 3 and 4. A numeric value was evaluated based on the comparative example 4. A greater numeric value represents a higher evaluation. In the evaluation, a numeric value of 90 points or more satisfies a standard.

[Evaluation of Fuel Consumption]

Referring to the tires according to the examples 15 to 28 and the comparative examples 4 to 6, a fuel consumption evaluation test was executed. A gasoline flowmeter was attached to the motorcycle used for the evaluation of a running stability. The fuel consumption evaluation test was executed by causing the motorcycle to run over a circuit course. A running condition includes a distance of 1000 km and a speed of 100 km/h. A fuel consumption was calculated from an amount of consumed gasoline in the fuel consumption evaluation test. The result is shown in the following Tables 3 and 4. A numeric value was evaluated based on the comparative example 4. The fuel consumption enhanced as compared with the comparative example 4 is shown in % with the fuel consumption according to the comparative example 4 set to be 100%. In the evaluation, a greater numeric value represents a more enhancement in the fuel consumption.

TABLE 3

Result of Evaluation

|  | Compara. example 4 | Example 16 | Example 17 | Example 15 | Example 18 | Example 19 | Compara. example 5 |
|---|---|---|---|---|---|---|---|
| Ratio (Wc/Wt) | — | 0.15 | 0.20 | 0.25 | 0.30 | 0.40 | 0.50 |
| Center region tan δc | 0.27 | 0.09 | 0.09 | 0.09 | 0.09 | 0.09 | 0.09 |
| Shoulder region tan δs |  | 0.27 | 0.27 | 0.27 | 0.27 | 0.27 | 0.27 |
| Base layer tan δb |  | 0.09 | 0.09 | 0.09 | 0.09 | 0.09 | 0.09 |
| Fuel consumption enhancement ratio (%) | — | 2.0 | 4.0 | 5.0 | 5.0 | 5.5 | 6.0 |
| Cornering grip performance  Dry road | 100 | 100 | 100 | 100 | 100 | 95 | 90 |
| Cornering grip performance  Wet road | 100 | 100 | 100 | 100 | 100 | 90 | 80 |
| Accelerating grip performance | 100 | 95 | 95 | 95 | 90 | 90 | 85 |

TABLE 4

| | Example 20 | Example 21 | Example 22 | Example 23 | Compara. example 6 | Example 24 | Example 25 | Example 26 | Example 27 | Example 28 |
|---|---|---|---|---|---|---|---|---|---|---|
| Ratio (Wc/Wt) | 0.25 | 0.25 | 0.25 | 0.25 | 0.25 | 0.25 | 0.25 | 0.25 | 0.25 | 0.25 |
| Center region tan$\delta$c | 0.05 | 0.09 | 0.15 | 0.20 | 0.20 | 0.09 | 0.09 | 0.09 | 0.09 | 0.09 |
| Shoulder region tan$\delta$s | 0.27 | 0.27 | 0.27 | 0.27 | 0.27 | 0.15 | 0.20 | 0.25 | 0.35 | 0.40 |
| Base layer tan$\delta$b | 0.05 | 0.07 | 0.07 | 0.07 | 0.20 | 0.07 | 0.07 | 0.07 | 0.07 | 0.07 |
| Fuel consumption enhancement ratio (%) | 6.8 | 4.5 | 3.0 | 2.5 | 0.1 | 4.8 | 4.8 | 4.8 | 4.6 | 4.0 |
| Cornering grip performance Dry road | 95 | 100 | 100 | 100 | 100 | 90 | 95 | 99 | 110 | 115 |
| Cornering grip performance Wet road | 100 | 100 | 100 | 100 | 100 | 85 | 92 | 98 | 130 | 135 |
| Accelerating grip performance | 80 | 90 | 95 | 98 | 99 | 90 | 90 | 92 | 95 | 100 |

As shown in the Tables 1 to 4, the tire pair according to each of the examples is excellent in various performances. From the result of the evaluation, advantages of the present invention are apparent.

INDUSTRIAL APPLICABILITY

A tire according to the present invention can be attached to various motorcycles. In particular, the tire is effective for a motorcycle of a tourer type which carries out long distance running over a highway.

The invention claimed is:

1. A tire for a motorcycle comprising:
a tread and a carcass having a radial structure,
the tread including a base layer positioned on an inside in a radial direction and a cap layer positioned on an outside,
the cap layer having a center region and a pair of shoulder regions positioned on an outside in an axial direction with respect to the center region,
a ratio (Wc/Wt) of a width Wc of the center region to a width Wt of the tread being set to equal to or higher than 0.15 and being set to equal to or lower than 0.25, so that the center region comes in contact with a ground while the shoulder region does not come in contact with the ground in straight running at a constant speed, and the center region and a part of the shoulder region come in contact with the ground in the braking and accelerating operations,
a loss tangent tan $\delta$c of the center region being smaller than a loss tangent tan $\delta$s of the shoulder region,
a loss tangent tan $\delta$b of the base layer being smaller than the loss tangent tan $\delta$s of the shoulder region,
the loss tangent tan $\delta$b of the base layer being equal to or smaller than 0.12, and
the loss tangent tan $\delta$b of the base layer being equal to or smaller than the loss tangent tan $\delta$c of the center region,
wherein the loss tangent tan $\delta$c of the center region is equal to or greater than 0.05 and is equal to or smaller than 0.15, and the loss tangent tan $\delta$s of the shoulder region is equal to or greater than 0.20 and is equal to or smaller than 0.35, and
wherein the cap layer is laminated on an outside in the radial direction with respect to the base layer, and the base layer extends from one end of the tread to the other end of the tread.

2. The tire according to claim 1, wherein the loss tangent tan $\delta$b of the base layer is smaller than the loss tangent tan $\delta$c of the center region.

3. The tire according to claim 2, wherein a ratio (tan $\delta$s/tan $\delta$b) of the loss tangent tan $\delta$s of the shoulder region to the loss tangent tan $\delta$b of the base layer is equal to or higher than two.

4. The tire according to claim 1, wherein a ratio (tan $\delta$s/tan $\delta$b) of the loss tangent tan $\delta$s of the shoulder region to the loss tangent tan $\delta$b of the base layer is equal to or higher than two.

* * * * *